(12) United States Patent
Lund et al.

(10) Patent No.: US 7,840,381 B2
(45) Date of Patent: Nov. 23, 2010

(54) METHOD AND APPARATUS FOR DETERMINING THE OPERATIONAL STATE OF A NAVIGATION SYSTEM

(75) Inventors: Christopher A. Lund, Otsego, MN (US); Lawrence C. Vallot, Shoreview, MN (US); Scott I. Snyder, Mahtomedi, MN (US); Richard S. Russell, Roseville, MN (US)

(73) Assignee: Honeywell International Inc., Morristown ( * ) Notice: Subject to any disclaimer, the term of this patent is extended or adjusted under 35 U.S.C. 154(b) by 246 days.

(21) Appl. No.: 12/245,250

(22) Filed: Oct. 3, 2008

(65) Prior Publication Data

US 2010/0088064 A1 Apr. 8, 2010

(51) Int. Cl.
*G06F 19/00* (2006.01)
(52) U.S. Cl. .................................................. 702/183
(58) Field of Classification Search ......... 702/182–185, 702/188
See application file for complete search history.

(56) References Cited

U.S. PATENT DOCUMENTS

| | | | |
|---|---|---|---|
| 7,043,343 B1 | 5/2006 | Houlberg et al. | |
| 7,363,149 B2 | 4/2008 | Klausner et al. | |
| 7,412,319 B2 | 8/2008 | Fujioka et al. | |
| 7,415,328 B2 | 8/2008 | Volponi | |
| 2005/0234644 A1* | 10/2005 | Lin | 701/214 |
| 2005/0240347 A1* | 10/2005 | Yang | 701/220 |
| 2007/0118286 A1* | 5/2007 | Wang et al. | 701/213 |
| 2009/0254278 A1* | 10/2009 | Wang | 701/216 |

* cited by examiner

*Primary Examiner*—Edward Raymond
(74) *Attorney, Agent, or Firm*—Fogg & Powers LLC

(57) ABSTRACT

A method of determining an operational state of a navigation system of a platform is provided. The method comprises testing at least a portion of hardware in the navigation system. Additionally, a measurement of at least one navigation variable from an inertial sensor is combined with a measurement of another navigation variable. A plurality of residuals for the measurement of at least one navigation variable and the measurement of another navigation variable are determined with a blending filter. An error for the measurement of at least one navigation variable is estimated based on the plurality of residuals. The method also predicts an error for the measurement of at least one navigation variable while the navigation system is in route. A determination is made as to whether the navigation system meets operational standards based on testing at least a portion of hardware, estimating an error for the measurement of at least one navigation variable, and predicting an error for the measurement of at least one navigation variable. Finally, one of a first state and a second state of the navigation system is output, the first state indicating that the navigation system does meet operational standards and the second state indicating that the navigation system does not meet operational standards.

20 Claims, 3 Drawing Sheets

METHOD AND APPARATUS FOR DETERMINING THE OPERATIONAL STATE OF A NAVIGATION SYSTEM

BACKGROUND

A platform's position, velocity, and/or attitude (as well as other navigation variables) are often determined by a navigation system. The navigation variables can then be used by either a human operator or a controlling algorithm to direct the movement of the platform. The navigation variables are often determined by inertial sensors. In addition to the inertial sensors, aiding source(s), such as a global position system (GPS) receiver, may be used to supplement the data received from the inertial sensors. Inertial sensors provide measurements, such as specific force and angular velocity, as experienced by the host platform. A GPS receiver can independently provide additional platform navigation variables using signals received from GPS satellites. The navigation variables received from the inertial sensors and the aiding device(s), however, may contain errors because of, for example, open loop measurements by the inertial sensors or noise in the signals from the GPS satellites.

SUMMARY

The following summary is made by way of example and not by way of limitation. In one embodiment, a method of determining an operational state of a navigation system of a platform is provided. The method comprises testing at least a portion of hardware in the navigation system. Additionally, a measurement of at least one navigation variable from an inertial sensor is combined with a measurement of another navigation variable. A plurality of residuals for the measurement of at least one navigation variable and the measurement of another navigation variable are determined with a blending filter. An error for the measurement of at least one navigation variable is estimated based on the plurality of residuals. The method also predicts an error for the measurement of at least one navigation variable while the navigation system is in route. A determination is made as to whether the navigation system meets operational standards based on testing at least a portion of hardware, estimating an error for the measurement of at least one navigation variable, and predicting an error for the measurement of at least one navigation variable. Finally, one of a first state and a second state of the navigation system is output, the first state indicating that the navigation system does meet operational standards and the second state indicating that the navigation system does not meet operational standards.

DRAWINGS

In accordance with common practice, the various described features are not drawn to scale but are drawn to emphasize specific features relevant to the present disclosure.

DETAILED DESCRIPTION

Figure 1:
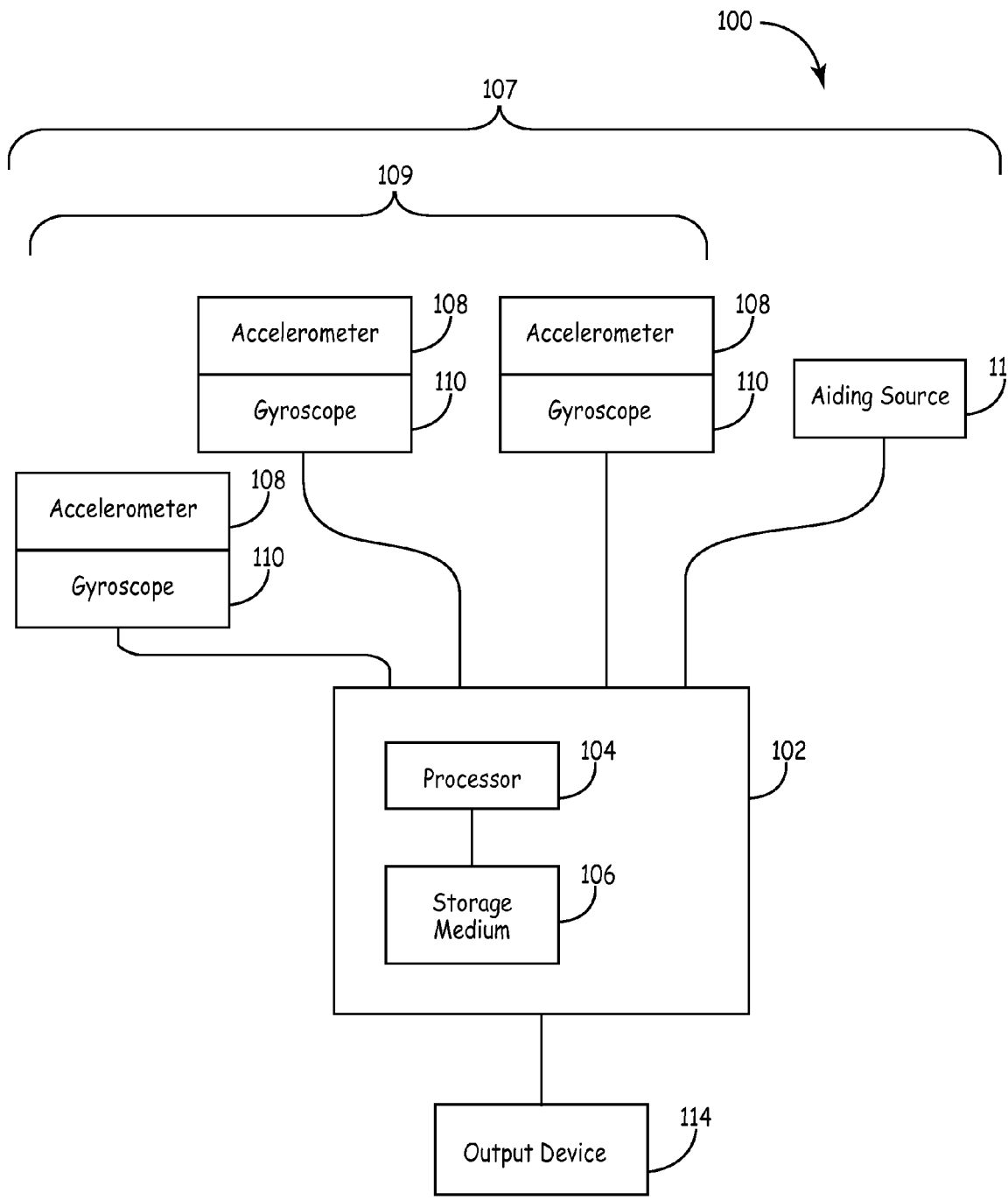
FIG. 1 is a block diagram of one embodiment of a navigation system for determining a navigation state of a platform.

FIG. 1 is one embodiment of an apparatus 100 for determining an operational state of a navigation system. In the embodiment illustrated in FIG. 1, apparatus 100 comprises a navigation system (referred to herein as "navigation system 100"). FIG. 1 includes a processing system 102 which can be implemented in various form factors and configurations including, for example, as a portable computer or can be embedded in (or otherwise incorporated in or communicatively coupled to) other electrical systems or devices.

Processing system 102 includes at least one programmable processor 104 (referred to herein as "processor 104"). In one embodiment, processor 104 comprises a microprocessor. Processor 104 executes various items of software. The software comprises program instructions that are embodied on one or more items of processor-readable media. For example, in one embodiment, processor readable media includes a hard disk drive or other mass storage device local to the processing system 102 and/or shared media such as a file server that is accessed over a network such as a local area network or wide area network such as the Internet. In one embodiment, the software is firmware which is embedded in a storage medium within processor 104. In the embodiment shown in FIG. 1, the software executed by processor 104 is embodied on a storage medium 106 which is communicatively coupled to processor 104.

In one embodiment, navigation system 100 is included within a platform. For example, in one embodiment, the platform in which navigation system 100 is included is a guided munition that is launched from an aircraft. In other embodiments, navigation system 100 is included within guided munitions launched from land, sea, or other air based vehicles or directly from a land based station. Additionally, in yet other embodiments, navigation system 100 is included within other land, water, or air based platforms, including but not limited to wheeled vehicles, boats, aircraft, and spacecraft. In one embodiment, the platform is fully autonomous. In an alternative embodiment, the platform is partially autonomous and partially human controlled. In still other embodiments, the platform is fully human controlled.

Navigation system 100 determines navigation related measurements (also referred to herein as "navigation variables") for the platform that can be used to control the movement of the platform. Navigation system 100 determines navigation variables through the use of a plurality of measurement devices 107. In the embodiment shown in FIG. 1, the plurality of measurement devices includes an inertial sensor suite 109 and an aiding source 112. Aiding source is a device that can perform navigation related measurements independent of inertial sensor suite 109. In this embodiment, the inertial sensor suite 109 comprises three accelerometer-gyroscope pairs each pair comprising an accelerometer 108 and a gyroscope 110. In other embodiments, other motion sensing devices are used to determine the movement of the platform and/or a different number of accelerometers and/or gyroscopes are used. Additionally, in this embodiment, aiding source 112 comprises a GPS receiver, although in other embodiments, other aiding devices are used.

Processing system 102, accelerometers 108, and gyroscopes 110 together comprise an inertial navigation system for the platform. Accelerometers 108 measures the specific force experienced by the platform, and communicates the measured data (navigation variables) to processing system 102. Gyroscopes 110 measures the angular velocity experienced by the platform and also communicates the measured data (navigation variables) to processing system 102. Processing system 102 receives the navigation variables of specific force and angular velocity from accelerometers 108 and gyroscopes 110, and determines the position, velocity, attitude, and/or other variables of the platform. As known to those skilled in the art, processing system 102 is initially provided with the position, velocity, and attitude of the platform and then uses the navigation variables received from accelerometers 108 and gyroscopes 110 to determine an updated position, velocity, attitude, and/or other variables for the platform.

As stated above, navigation system 100 also includes an aiding source 112. As known to those skilled in the art, aiding source 112 determines the position, velocity, and/or other navigation variables of the platform. Aiding source 112 communicates the position, velocity, and/or other navigation variables to processing system 102.

In this embodiment, the platform navigation variables are based on the measurements from inertial sensor suite 109 and aiding source 112 is used as an aiding source to estimate errors present in the inertial sensor suite 109. In other embodiments, measurements from both inertial sensor suite 109 and aiding source 112 are blended to directly estimate the platform navigation variables.

Due to open loop measurements and/or inaccuracies of inertial sensor suite 109 each of the respective measurements from inertial sensor suite 109 may contain a certain amount of error. As a result the calculation of position, velocity, and/or other navigation variables also may contain a certain amount of error. These measurement errors affect the accuracy of the platform navigation variables. Depending on the desired purpose and design of the platform that navigation system 100 is within, there may be a limit at which the accuracy becomes too poor to effectively complete the task, or to complete the task with the desired confidence level. Additionally, the errors of inertial sensor suite 109 may change over time due to changing environmental conditions, malfunctioning equipment, or other factors.

Thus, there may be situations when it is desirable to know the current status (error level, accuracy, etc.) of navigation system 100, so that decisions and appropriate actions may be made regarding navigation system 100 and the platform. For example, when navigation system 100 is in a good operational state, an operator may determine that it is appropriate to send/launch the platform on its intended route. In contrast, when navigation system 100 is in a poor operational state, an operator may wait until the operational state improves prior to sending/launching the platform or may abort the mission altogether. Additionally, if the platform is sent during a good operational state, but navigation system 100 changes to a poor operational state during operation, then the platform can be halted during operation or other action can be taken as appropriate.

In one embodiment, processing system 102 determines the status of navigation system 100, and outputs an indication of the status through an output device 114 which is coupled to processing system 102. In one embodiment, output device 114 is coupled to processor 104. In another embodiment, processing system 102 outputs an indication of the status to a software program, which then takes appropriate action to output through output device 114.

In one embodiment, navigation system 100 is determined to be in one of two states, operational or non-operational. When processing system 102 determines which state (operational or non-operational) navigation system 100 is in, the state is output on output device 1 14. For example, in one embodiment, output device 114 is a light that shows a green color for an operational state and a red color for a non-operational state. Alternatively, when output device 114 is a light, the light is unlit prior to making a determination of the state of navigation system 1 14. If navigation system 100 is determined to be in a non-operational state, the light remains unlit; whereas, if navigation system 100 is determined to be in an operational state, the light is lit. In another embodiment, output device 114 is a computer monitor which displays the status as text or images on the monitor. In yet another embodiment, output device 114 is a speaker, which emits different audible signals for each state of navigation system 100. In other embodiments, the status is determined for more than two states and an indication of the determined state is provided on output device 114.

Figure 2:
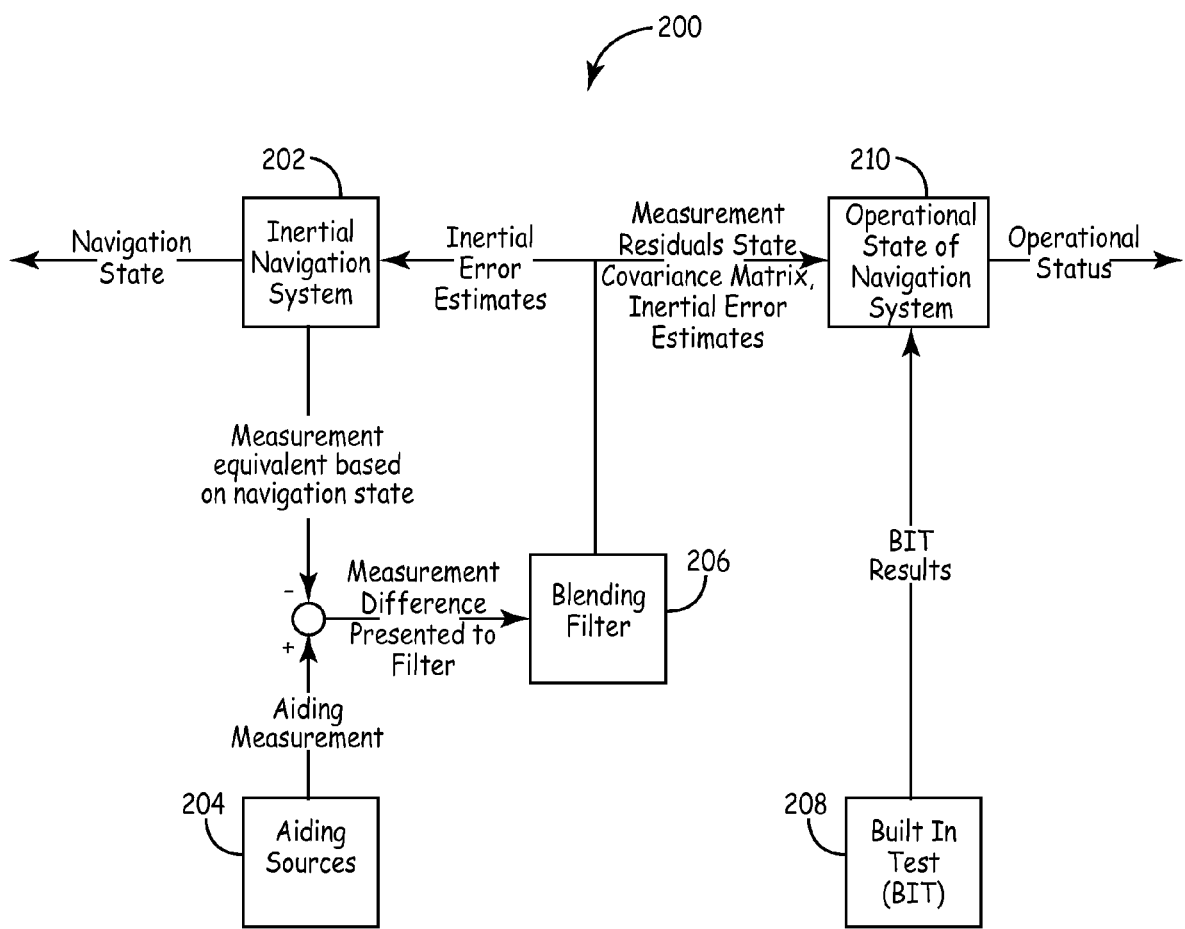
FIG. 2 is a block diagram illustrating one embodiment for determining a navigation state of a platform.
Figure 3:
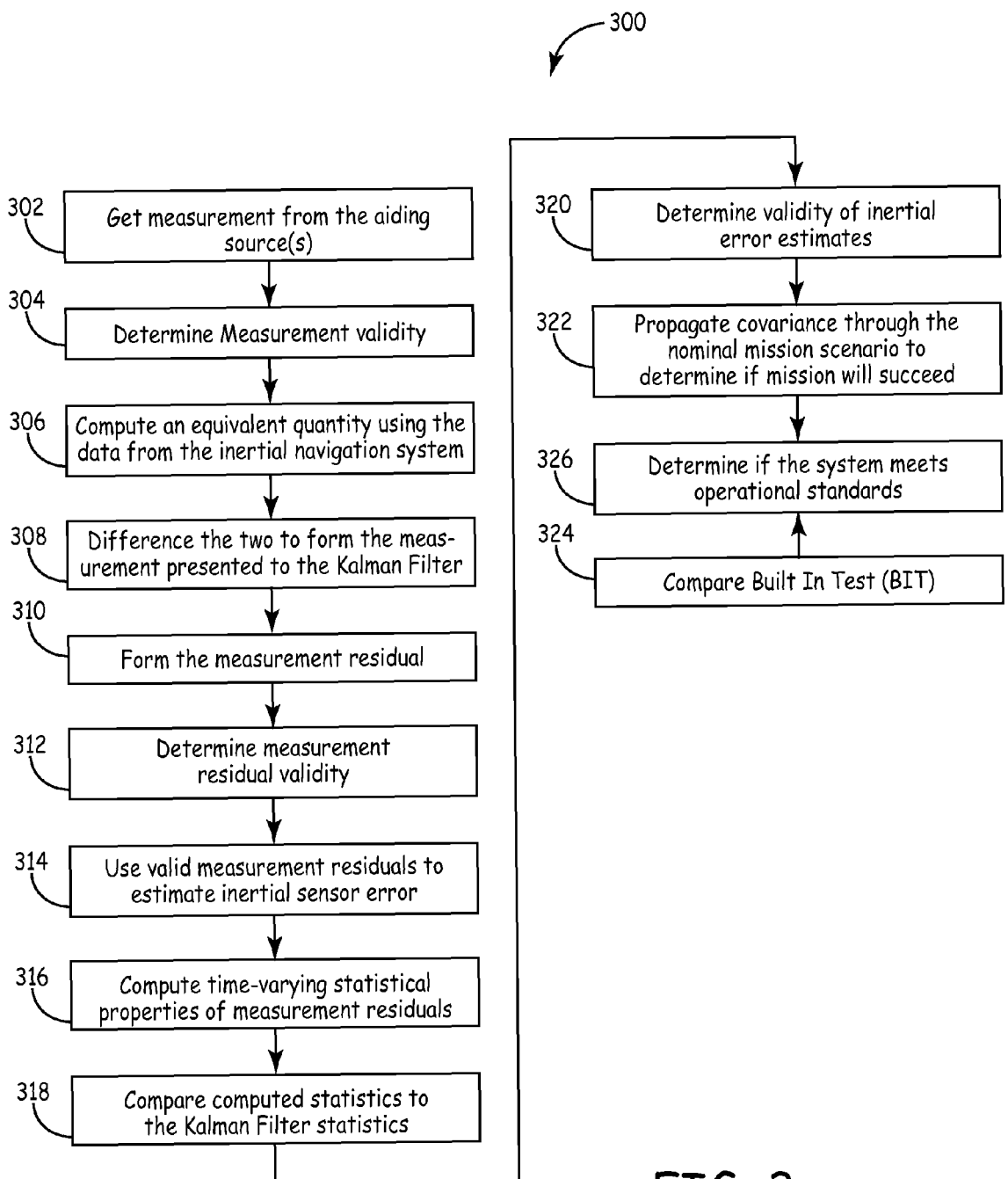
FIG. 3 is a flow chart illustrating one embodiment of a method for determining a navigation state for a platform.

The operation of system 100 will now be described with reference to FIGS. 2 and 3. FIG. 2 illustrates one embodiment of a block diagram 200 for determining and communicating the operational state of a platform. FIG. 3 illustrates one embodiment of a method 300 for determining and communicating the operational state of a platform. Block diagram 200 and method 300 can be used by navigation system 100 to determine which state it is in by performing one or more tests and basing the determination of operational/non-operational on the results of the tests. For example, in one embodiment, navigation system 100 performs five tests and the system is determined as operational if navigation system 100 passes all five of the tests. In another embodiment, navigation system 100 is determined as operational if four of the five tests are passed. In other embodiments, other numbers of tests are performed and other thresholds are used for determining whether navigation system 100 is operational or non-operational. Additional information regarding the tests is provided below with reference to FIGS. 2 and 3. Although in the embodiment of FIGS. 2 and 3, a certain number of tests are shown and the tests are shown in a certain order, in other embodiments, more or fewer tests than that shown in FIGS. 2 and 3 are used, and/or the tests are conducted in an order different from that shown in FIGS. 2 and 3.

In one embodiment one test in which navigation system 100 performs, is a test of inertial sensor suite 109, such as a test of accelerometer(s) 108 and/or gyroscope(s) 110 to determine whether inertial sensor suite 109 is performing within a threshold. The threshold can be determined based on required or desired precision of movement, purpose of the mission of the platform, and/or other factors.

Inertial sensor suite 109 performs a measurement on the platform at block 202. Aiding source 112 also performs a measurement at blocks 204 and 302. In one embodiment at block 304, the validity of the measurement from aiding source 112 is determined. For example, in one embodiment, the validity is checked based on multiple redundant measurements taken by aiding source 112. When a GPS receiver has more than 4 pseudorange measurements, the additional (redundant) measurements are compared to each other to determine an error for the measurements by the GPS receiver. Additionally, in one embodiment, multiple aiding sources (such as another GPS receiver) are used and the measurements from each aiding source are compared against each other to determine an error for one or more aiding source. The redundant measurements by aiding source 112 are used to detect and isolate errors in the measurements provided by aiding source 1 12. Methods to detect and isolate errors are known to those skilled in the art (often referred to as Receiver Autonomous Integrity Monitoring [RAIM] in GPS receivers or parity space methods in general) and are not described in more detail herein.

At block 306, the measurements from inertial sensor suite 109 are then converted to navigation variables equivalent to the navigation variables from aiding source 112. This enables the measurements from inertial sensor suite 109 to be compared to the measurements from aiding source 112. At block 308, the navigation variables from the inertial sensor suite 109 are then differenced with the navigation variables from aiding source 1 12. The resultant difference is presented to a blending filter 206 located in processing system 102. For example, in this embodiment the blending filter is a Kalman filter.

The Kalman filter has knowledge of previous errors which were present in inertial sensor suite 109. The Kalman filter also knows what error sources are present and maintains the information about errors in its state vector. The Kalman filter knows how these errors behave over time and in response to stimulus and this information is contained in the process model. Furthermore, the Kalman filter knows the relationship between the state vector and the navigation variables received. Based on this, at block 310, the Kalman filter forms measurement residuals. The measurement residuals indicate how much error is present in the state vector. The Kalman filter takes the information contained in the measurement residuals and distributes it across the state vector using the Kalman gain. This is used to estimate the error in the measurements from inertial sensor suite 109. The Kalman filter models the amount of error in the difference measurement received and in the state vector. At block 312, this information is used to form the Kalman gain and it is also used to assess the validity of the measurement residuals. The Kalman filter compares the amount of error in the measurement residual to the amount of error that the Kalman filter modeled. If the two errors are consistent with each other (within a certain threshold), then the residuals are determined to be valid and the test is passed. If the two errors are not consistent with each other (exceeding a certain threshold), then the residuals are determined to be invalid and the test is failed.

At block 314, the valid measurement residuals are then used to estimate the inertial sensor error. At block 316, time-varying statistical properties of the measurement residuals are computed. At block 318, in one embodiment, navigation system 100 tests the measurement residuals to determine if their noise is exhibiting normal noise characteristics. The measurement residuals pass the test if they exhibit appropriate statistical characteristics. For example, the Root Mean Square (RMS) values of the residuals can be analyzed. Additionally, if the measurement residuals are not "white" or if they do not have a zero mean, the filter likely has a fault and is determined to have failed the test. On the other hand, if the measurement residuals are "white" and they do have a zero mean, the filter is likely working properly and the test is passed.

In one embodiment at block 320, the errors of inertial sensor suite 109 are compared to the expected error range for the particular inertial sensor suite 109. Here, the errors of inertial sensor suite 109 as determined from the measurement residuals are checked against known error ranges to determine whether the particular inertial sensor suite 109 is operating normally. For example, in one embodiment, the errors of accelerometers 108 are checked against the known range of errors for the particular family of accelerometers to which accelerometers 108 belong. If accelerometers 108 are not acting normally, then there may be something wrong with accelerometers 108 and it does not pass the test. For example, if the measurement received from accelerometers 108 are accurate to within 10 milli-gs, but the particular family that accelerometers 108 are in, typically has errors around 1 milli-g, accelerometers 108 are determined not to have passed the test. In other embodiments, other criteria are used to determine whether the particular part of inertial sensor suite 109 is performing normally. For example, in other embodiments, the operating environment or past operating history of the particular inertial sensor suite 109 is compared against the current error received to determine if the particular inertial sensor suite 109 is operating normally.

At block 322, in one embodiment, navigation system 100 predicts whether the errors will be within a threshold while the platform is operating on its route. In one embodiment, the route of the platform is inputted or selected from a list. Based on the route, navigation system 100 predicts a forward propagation of its errors as the platform travels along the route. Navigation system 100 then compares these errors to a threshold to determine whether the mission would be successful. Information from the Kalman filter is used to estimate the errors.

In one embodiment, in order to pass this test, navigation system 100 errors must be within the threshold during the entire route until the platform reaches the destination. In another embodiment, in order to pass the test, the estimated errors must operate within the threshold for a certain percentage of the route. In other embodiments, other criteria, such as a varying threshold based on the length of the route, is used to determine the relationship between the estimated errors and the threshold required to pass the test.

In some situations measurements from aiding source 112 may not be available due to atmospheric conditions, obstructions in the signal path between the satellites and the receiver, or other conditions. Thus, in one embodiment, the forward propagation of the errors is determined assuming aiding source 112 is operational and thus, the navigation variables from aiding source 112 are included in Kalman filter calculations. In another embodiment, the forward propagation of the errors is determined assuming aiding source 112 is non-operational and thus, the navigation variables from aiding source 112 are not included in the Kalman filter calculations. In yet another embodiment, the forward propagation of errors is determined twice. Once assuming aiding source 112 is operational and again assuming aiding source 112 is non-operational. In this embodiment, in order to pass the test, the errors must be within the threshold for both aiding source 112 operational and non-operational situations.

At blocks 208 and 324, in one embodiment, one test in which navigation system 100 performs for determining the state navigation system 100 is a hardware test (also referred to herein as the Built In Test [BIT]). The hardware test is a basic test that checks some or all of the hardware in navigation system 100 to verify that each hardware component performs its basic operation successfully and that the various hardware components are communicating correctly. For example, in one embodiment a memory test is run in order to detect issues with the system. In this embodiment, the hardware is determined to have passed the test when there are no errors with any of the hardware tested. In one embodiment, navigation system 100 is determined to be in a non-operational state if the hardware test is failed, regardless of the results of other tests. Hardware tests are well known in the art and are not described in further detail herein.

At blocks 210 and 326, once the one or more tests have been conducted, navigation system 100 determines its operational state based on the one or more tests. In one embodiment, navigation system 100 outputs an indication of its operational status via output device 114. In another embodiment, after processing system 102 determines the status of navigation system 100, processing system 102 outputs an indication of the status to an operator through output device 114.

In one embodiment, some or all of the previously described tests are used during production of navigation system 100 to determine whether navigation system 100 meets production standards before leaving the factory for shipment to a customer. In one embodiment, some or all of the previous tests are conducted by navigation system 100 and an operational or non-operational determination is made and communicated to the production tester. If navigation system 100 returns an operational state, then navigation system 100 continues to finish production. If navigation system 100 returns a non-operational state, then navigation system 100 is fixed, discarded, or other appropriate action is taken. Advantageously, using the above tests to determine whether navigation system 100 is working properly may reduce production cost. For example, the above tests may be built-in to navigation system 100, thus potentially eliminating some test equipment. Additionally, when the determination is made between one of two states (operation, or non-operational) a quick and easy line is drawn as to which units meet production standards and which units do not meet production standards.

Instructions for carrying out the various process tasks, calculations, and generation of signals and other data used in the operation of the methods described above can be implemented in a program product including software, firmware, or other processor readable instructions. These instructions are typically stored on any appropriate processor readable medium used for storage of processor readable instructions or data structures. Such processor readable media can be any available media that can be accessed by a general purpose or special purpose computer or processor, or any programmable logic device.

Suitable processor readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of processor executable instructions or data structures. Any of the foregoing may be supplemented by, or incorporated in, specially-designed Application Specific Integrated Circuits (ASICs) or Field Programmable Gate Arrays (FPGAs). When information is transferred or provided over a network or another communications connection (either hardwired, wireless, or a combination of hardwired and wireless) to a processor, the processor properly views the connection as a processor readable medium. Thus, any such connection is properly termed a processor readable medium. Combinations of the above are also included within the scope of processor readable media.

The method of the invention can be implemented in processor readable instructions, such as program modules or applications, which are executed by a data processor. Generally, program modules or applications include routines, programs, objects, data components, data structures, algorithms, and the like, which perform particular tasks or implement particular abstract data types. These represent examples of program code for executing steps of the methods disclosed herein. The particular sequence of such executable instructions or associated data structures represent examples of corresponding acts for implementing the functions described in such steps.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method of determining an operational state of a navigation system comprising:
   testing at least a portion of hardware in the navigation system;
   combining a measurement of at least one navigation variable from an inertial sensor with a measurement of another navigation variable;
   determining a plurality of residuals for the measurement of at least one navigation variable and the measurement of another navigation variable with a blending filter;
   estimating an error for the measurement of at least one navigation variable based on the plurality of residuals;
   predicting an error for the measurement of at least one navigation variable while the navigation system is in route;
   determining whether the navigation system meets operational standards based on testing at least a portion of hardware, estimating an error for the measurement of at least one navigation variable, and predicting an error for the measurement of at least one navigation variable; and
   outputting one of a first state and a second state of the navigation system, the first state indicating that the navigation system does meet operational standards and the second state indicating that the navigation system does not meet operational standards.

2. The method of claim 1, wherein determining whether the navigation system meets operational standards is based on determining a Root Mean Square (RMS) value for the plurality of residuals.

3. The method of claim 1, wherein determining whether the navigation system meets operational standards is based on determining whether noise within the blending filter is exhibiting normal characteristics.

4. The method of claim 1, further comprising: measuring the at least one navigation variable with an inertial sensor; and measuring the another navigation variable with an aiding source.

5. The method of claim 1, wherein predicting the error for the measurement of at least one navigation variable while the navigation system is en route, predicts the error for the measurement of at least one navigation variable using only measurements from inertial sensors.

6. The method of claim 1, wherein predicting the error for the measurement of at least one navigation variable while the navigation system is en route, predicts the error for the measurement of at least one navigation variable once using only measurements from the inertial sensors and again using measurements from inertial sensors and an aiding source.

7. The method of claim 1, wherein determining whether the navigation system meets operational standards is based on determining whether the error for the measurement of at least one navigation variable is within an expected range for a performance class of the inertial sensor.

8. The method of claim 7, wherein the system is determined to be in the first state when no errors are found when testing at least a portion of hardware, when the error for the measurement of at least one navigation variable is consistent with a modeled amount, and when the error for the measurement of at least one navigation variable is within an expected range of the measurement device.

9. An apparatus for determining the operational state of a navigation system comprising:
   a processor for executing software;
   an output device communicatively coupled to the processor;

at least one inertial sensor communicatively coupled to the processor;

a Global Positioning System (GPS) receiver coupled to the processor;

a storage medium communicatively coupled to the processor from which the processor reads at least a portion of the software for execution thereby, wherein the software is configured to cause the processor to:

test at least a portion of hardware that takes navigational measurements;

receive a measurement of at least one navigation variable from the at least one inertial sensor;

receive a measurement from the an aiding source;

combine the measurement of at least one navigation variable with the measurement from the aiding source;

determine a plurality of residuals for the measurement of at least one navigation variable with a blending filter;

estimate an error for the measurement of at least one navigation variable based on the plurality of residuals;

predicting an error for the measurement of at least one navigation variable while the navigation system is en route;

determine whether the navigation system meets operational standards based on the test of at least a portion of hardware, the estimate of an error for the measurement of at least one navigation variable, and the prediction of an error for the measurement of at least one navigation variable; and output one of first state and a second state of the navigation system on the output device, the first state indicating that the system does meet operational standards and the second state indicating that the system does not meet operational standards.

10. The apparatus of claim 9, wherein the software is further configured to cause the processor to:

determine a Root Mean Square (RMS) value for the plurality of residuals; and determine whether the navigation system meets operational standards based on the RMS value for the plurality of residuals.

11. The apparatus of claim 9, wherein the software is further configured to cause the processor to:

determine whether noise within the blending filter is exhibiting normal characteristics; and determine whether the navigation system meets operational standards based on whether the noise within the blending filter is exhibiting normal characteristics.

12. The apparatus of claim 9, wherein the software is further configured to cause the processor to:

predict an error for the measurement of at least one navigation variable using only the measurement from the at least one inertial sensor.

13. The apparatus of claim 9, wherein the software is further configured to cause the processor to:

predict an error for the measurement of at least one navigation variable once using only the measurement from the at least one inertial sensor, and again using the measurement from the at least one inertial sensor and the measurement from the aiding source.

14. The apparatus of claim 9, wherein the software is further configured to cause the processor to:

determine whether the error for a measurement of at least one navigation variable is within an expected range for that measurement device; and determine whether the navigation system meets operational standards based on whether the estimated inertial errors are within an expected range for a given inertial sensor performance class.

15. A non-transitory computer readable medium containing computer instructions stored therein for causing a computer processor to perform the steps, including: test at least a portion of hardware that takes navigational measurements; combine a measurement of at least one navigation variable from an inertial sensor with a measurement of another navigation variable; determine a plurality of residuals for the measurement of at least one navigation variable with a blending filter; estimate an error for the measurement of at least one navigation variable based on the plurality of residuals; predict an error for the measurement of at least one navigation variable while the navigation system is en route; determine whether the navigation system meets operational standards based on the test of at least a portion of hardware, the estimate of an error for the navigation variable, and the prediction of an error of at least one navigation variable; and output one of first state and a second state of the navigation system, the first state indicating that the navigation system does meet operational standards and the second state indicating that the navigation system does not meet operational standards.

16. The computer readable medium of claim 15, wherein the program instructions are further operable to: determine a Root Mean Square (RMS) value for the plurality of residuals; and determine whether the navigation system meets operational standards based on the RMS value for the plurality of residuals.

17. The computer readable medium of claim 15, wherein the program instructions are operable to: determine whether noise within the blending filter is exhibiting normal characteristics; and determine whether the navigation system meets operational standards based on whether the noise within the blending filter is exhibiting normal characteristics.

18. The computer readable medium of claim 15, wherein the program instructions are operable to: receive a measurement of at least one navigation variable from at least one inertial sensor; and receive a measurement from a global positioning system (GPS) receiver.

19. The computer readable medium of claim 18, wherein the program instructions are operable to: predict an error of at least one navigation variable once using only the measurement from the at least one inertial sensor, and again using the measurement from the at least one inertial sensor and the measurement from the GPS receiver.

20. The computer readable medium of claim 15, wherein the program instructions are operable to: determine whether the error for a measurement of at least one navigation variable is within an expected range for that measurement device; and determine whether the navigation system meets operational standards based on whether the error for a measurement of at least one navigation variable is within an expected range for an inertial sensor.

* * * * *

UNITED STATES PATENT AND TRADEMARK OFFICE
CERTIFICATE OF CORRECTION

| | | |
|---|---|---|
| PATENT NO. | : 7,840,381 B2 | Page 1 of 1 |
| APPLICATION NO. | : 12/245250 | |
| DATED | : November 23, 2010 | |
| INVENTOR(S) | : Lund et al. | |

It is certified that error appears in the above-identified patent and that said Letters Patent is hereby corrected as shown below:

At Column 8, line 15, please replace "the navigation system is in" with --the navigation system is en--

Signed and Sealed this
Thirteenth Day of March, 2012

David J. Kappos
*Director of the United States Patent and Trademark Office*